US008924073B2

(12) United States Patent
Marino et al.

(10) Patent No.: US 8,924,073 B2
(45) Date of Patent: Dec. 30, 2014

(54) PORTABLE MAINTENANCE AID BASED PRELOAD TEST UNIT AND STRAY VOLTAGE DETECTOR

(75) Inventors: Charles E. Marino, Benbrook, TX (US); Dennis D. Duke, White Settlement, TX (US); Roy A. Stott, Kennedale, TX (US); Paul L. Tran, Arlington, TX (US); Danny C. Carpenter, Azle, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 173 days.

(21) Appl. No.: 13/527,634

(22) Filed: Jun. 20, 2012

(65) Prior Publication Data

US 2014/0114528 A1   Apr. 24, 2014

Related U.S. Application Data

(60) Provisional application No. 61/498,769, filed on Jun. 20, 2011.

(51) Int. Cl.
*G06F 11/00* (2006.01)
*H03M 1/10* (2006.01)
*G07C 5/00* (2006.01)

(52) U.S. Cl.
CPC . *G07C 5/008* (2013.01); *G07C 5/00* (2013.01)
USPC .............. 701/32.8; 701/3; 703/8; 703/21; 324/72; 324/541; 324/544

(58) Field of Classification Search
CPC .................................. G06F 3/05; H04L 43/50
USPC ................ 701/3, 328; 703/8, 21; 324/72, 541
See application file for complete search history.

(56) References Cited

U.S. PATENT DOCUMENTS

| | | | | |
|---|---|---|---|---|
| 6,812,712 B2* | 11/2004 | Linzey | .......................... | 324/541 |
| 7,030,794 B2* | 4/2006 | Witte et al. | ................... | 341/120 |
| 7,092,867 B2* | 8/2006 | Huang et al. | .................... | 703/21 |
| 7,228,261 B2* | 6/2007 | Leonard et al. | .................... | 703/8 |
| 7,275,961 B2* | 10/2007 | Zauber et al. | ............ | 439/620.21 |
| 7,613,963 B1* | 11/2009 | Pylant et al. | ................... | 714/724 |
| 8,264,215 B1* | 9/2012 | Kovach et al. | .................. | 324/72 |
| 2005/0081733 A1* | 4/2005 | Leonard et al. | ............... | 102/288 |
| 2010/0218044 A1* | 8/2010 | Roblett et al. | .................. | 714/32 |
| 2012/0060672 A1* | 3/2012 | Grigg | ............................... | 89/1.8 |

* cited by examiner

*Primary Examiner* — Thomas G Black
*Assistant Examiner* — Wae Louie
(74) *Attorney, Agent, or Firm* — Daniel J. Long

(57) ABSTRACT

A Portable Maintenance Aid (PMA) having multiple applications for the electrical testing and data acquisition for various air/ground vehicle platforms is disclosed. The PMA includes an interface adapter that has a number of electrical testing interfaces and data collection ports in addition to a stray voltage detector. The portable testing aid also includes a user interface that transmits data to the interface adapter and a display that communicates the testing and maintenance information to the user. The portable testing aid also includes a communication system for transferring information between the user interface, the display, and the interface adapter. The PMA provides a preload tester/stray voltage tester that is sustainable, less replaceable and has capability of filling the test voids.

18 Claims, 7 Drawing Sheets

PORTABLE MAINTENANCE AID BASED PRELOAD TEST UNIT AND STRAY VOLTAGE DETECTOR

CROSS-REFERENCE TO RELATED APPLICATIONS

This Application claims rights under 35 USC §119(e) from U.S. Application Ser. No. 61/498,769 filed Jun. 20, 2011, the contents of which are incorporated herein by reference.

TECHNICAL FIELD

Embodiments are generally related to maintenance testing units. Embodiments are also related to system and method for aircraft and military weapon maintenance and repair. Embodiments are additionally related to portable multi-use units for electrical maintenance and testing of vehicles and weapons.

BACKGROUND OF THE INVENTION

Combat forces use many different types of weapons from small field artillery to large ballistic missiles. Weapons may be fired from ships, planes, and ground stations. Most modern weapons have electronic components and systems that assist in locating targets, aiming weapons, and firing them. Weapons maintenance technicians maintain and repair weapons used by combat forces.

There are many kinds of weapons. For example, weapons include bombs, rockets and missiles. Weapons are fired from, or launched from, weapons platforms. One type of weapons platform is an aircraft. Another type of platform is a vehicle or a rocket or missile launcher.

Both weapons and weapons platforms have electrical circuits. The electrical circuits perform a variety of functions such as firing the weapons. For example, an aircraft may be loaded with the rockets. When the aircraft is on the ground, the rockets are disarmed and safed, so as to prevent accidental firing. In flight and after a target has been identified, the pilot or weapons officer fires one or more rockets electrically. A common firing mechanism involves providing electrical current to an igniter, which igniter initiates the rocket propulsion system.

The individual weapons are electrically connected to the platform circuits by way of connectors. The weapons systems circuits on platforms are checked to insure safe and reliable operation. Safe operation insures that a weapon will not accidentally fire unless and until the weapon is pointed at a target. Reliable operation insures that once properly aimed and fired, the weapon will release and fire as intended.

Prior art weapons circuits test systems for aircraft utilize an analog voltage detector and a kit of various connectors and test cables. The appropriate connector is selected and coupled to the aircraft connector. The appropriate test cable extends between the test connector and the voltage detector. The test systems test for stray voltage on the aircraft weapons circuit to prevent accidental firing. The test system also tests for the presence of voltage on the aircraft weapons circuit to insure sufficient voltage for firing. An electro-explosive device load test, continuity in the weapons circuit and a self test of the test circuit are also performed.

Currently, the F-16 aircraft utilizes an Armament Circuits Preload Test Unit (AKA Stray Voltage Tester). The Armament Circuits Preload Test Unit is a single input handheld device that is limited capability. The Stray Voltage Tester (SVT) is not sustainable, has Diminishing Manufacturing Sources (DMS) issues, no growth allowance for additional testing modules and is of vintage 1980's technology. The current SVT has calibration and alignment requirements that needs additional test equipment. Also, the backshop maintainer requires many operational hours to perform the test. It also has test voids due to modern weapons being added to the F-16 aircraft.

Upgrading the existing SVT to meet current needs would be prohibitively expensive. A need therefore exists for improved preload tester/stray voltage tester that is sustainable, less replaceable and capable of filling the test voids for various air/ground vehicle platforms.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the present invention to provide for maintenance testing units.

It is another aspect of the disclosed embodiment to provide for a system and method for aircraft and military weapon maintenance and repair.

It is a further aspect of the disclosed embodiment to provide portable multi-use units for electrical maintenance and testing of vehicles and weapons.

It is a yet another aspect of the disclosed embodiment to provide a portable maintenance aid that has multiple applications for the electrical testing and data acquisition for various air/ground vehicle platforms.

It is a yet another aspect of the disclosed embodiment to provide an application of stray voltage and preload testing of armament and countermeasures interfaces.

The aforementioned aspects and other objectives and advantages can now be achieved as described herein. A portable maintenance testing aid for use in electrical testing and maintenance of vehicles and weaponry has a stray voltage detector and preload tester. The aid also has an interface adapter, a user interface, a display and a communication system. The interface adapter has a plurality of electrical testing and data acquisition ports. The user interface is configured to transmit data to the interface adapter. The display configured to communicate information from the interface adapter. Data can be communicated between the user interface, the display and the interface adapter by utilizing the communication system.

The PMA is versatile, has multiple applications, and has the growth potential to perform other data acquisition or testing applications. It also encompasses a rugged mobile hand-held computer which provides many opportunities for other maintenance applications across multiple air/ground vehicle platforms. The PMA includes an application of stray voltage and preload testing of armament and countermeasures interfaces.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Portable Maintenance Aid (PMA) is an interactive maintenance tool that allows mechanics and engineers to analyze and solve airplane problems at the work site for example in the hangar, on the shop floor, in the office, or at the flight line. All the information necessary to return the airplane to service in the minimum time is at maintainer fingertips.

Figure 1:
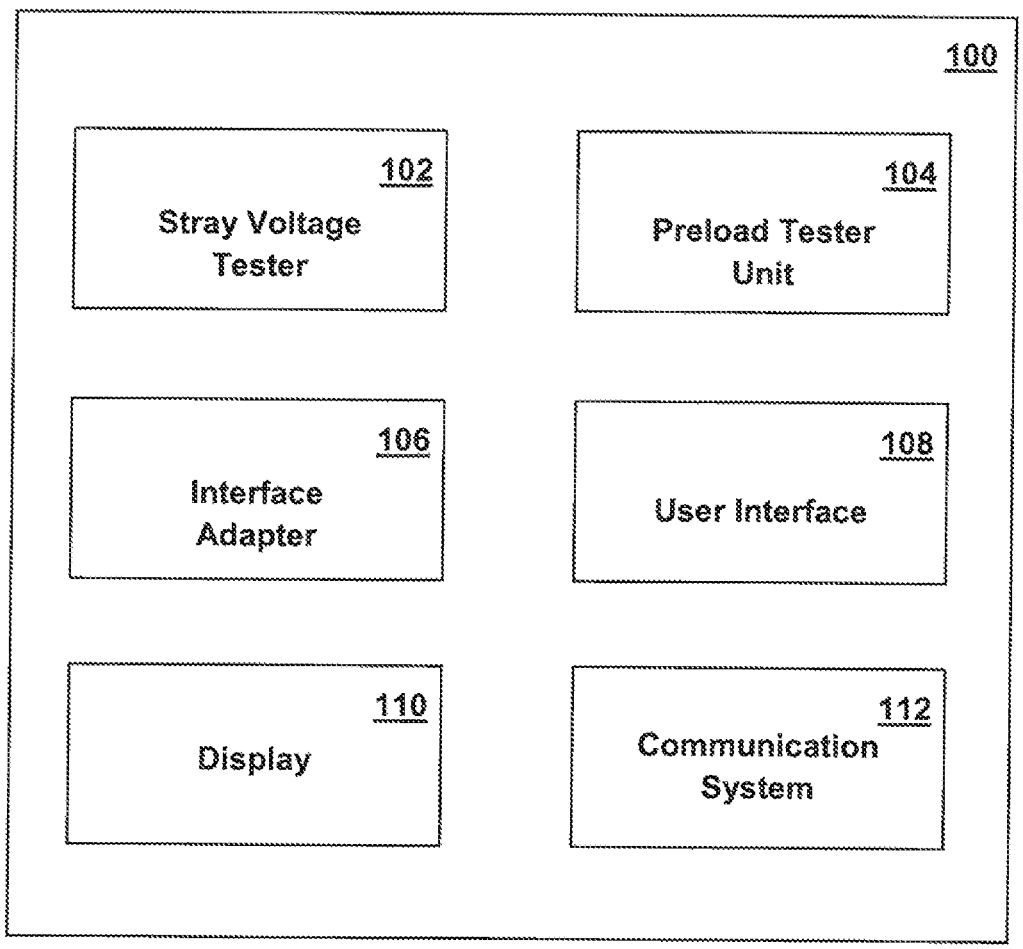
FIG. 1 illustrates a block diagram of a portable maintenance testing aid, in accordance with the disclosed embodiments.

FIG. 1 illustrates a block diagram of a Portable Maintenance Aid (PMA) 100. The aid 100 includes a Stray Voltage Tester (SVT) 102 and a Preload Test Unit (PTU) 104. The SVT 102 and the PTU 104 are utilized to detect stray voltage on the aircraft weapons circuit to prevent accidental firing. The aid 100 also has an interface adapter 106, a user interface 108, a display 110 and a communication system 112. The interface adapter 106 has a plurality of electrical testing and data acquisition ports. The user interface 108 is configured to transmit data to the interface adapter 106. The display 110 is configured to communicate information from the interface adapter 106. Data can be communicated between the user interface 108, the display 110 and the interface adapter 106 by utilizing the communication system 112. The aid 100 provides the preload and stray voltage testing that is sustainable, drop in replaceable and has capability that fills the test voids in prior art systems.

Figure 2:
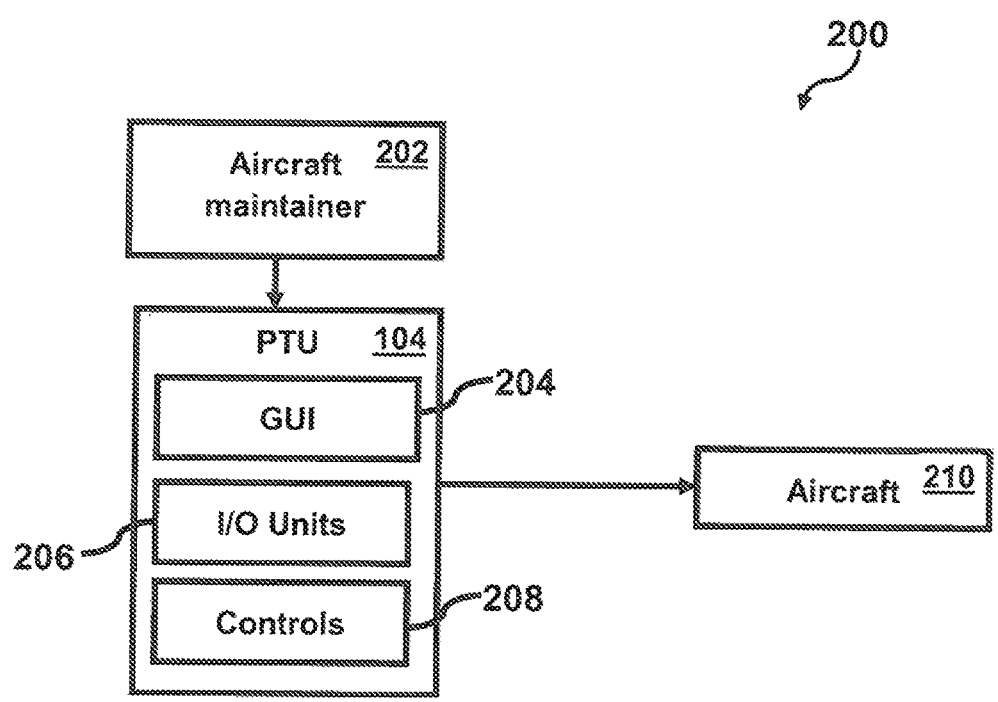
FIG. 2 illustrates a block diagram of a system utilized for performing preload test on an aircraft using a Preload Test Unit (PTU), in accordance with the disclosed embodiments.

Referring to FIG. 2, a block diagram of a system 200 utilized for performing a preload test on an aircraft 210, for example F-16 using a Preload Test Unit (PTU) 104 is disclosed. The PTU 104 includes a GUI 204, I/O units 206 and controls 208. The aircraft maintainer 202 sends commands to the aircraft 210 through PTU 104 to perform various tests for electrical maintenance and testing.

The various test modes for the PTU includes, detecting the presence of voltage such as 22 VDC, High Voltage-300 VDC and 22 VDC Pulse, presence of stray voltage, both DC and AC, presence of current, voltage, and timing of Electro Explosive Device (EED), presence of resistance, and absence of voltage. The other test modes include Mil-STD-1553 Multiplex Bus communication presence test, AIM-9 missile diamond rotation output test, missile audio output test, 115 VRMS AC test and self test.

Note that the PTU may be used to perform tests at the air vehicle to stores (weapons) interface, prior to weapon loading, for 30 day functional check/certification, for special weapons certification, and for safety checks ensuring no stray voltage is present prior to loading of weapons. The PTU connects to various test interface cables at the Unit's external I/O connector. The PTU indented to leverage Stores System Tester (SST) technology such as the Remote Control Unit.

The PMA toolkit core may also encompass diagnostics for several different maintenance needs including avionics, stores management system (SMS), electrical, wheels & tires and logistics.

Note that the additional applications of the PTU in the PMA toolkit includes stray voltage testing of the F-35 Advanced Rail Launcher (ARL), as well as Radio Frequency (RF) and Infrared Red (IR) Counter Measures dispensers, application towards the Common Munitions BIT Reprogramming Equipment, F-15 "Beer Can" tester replacement, improved Counter Measures Dispensing System (CMDS) Munitions Inventory Test Equipment, bar code scanning module and Unique Identification (UID) reader.

Figure 3:
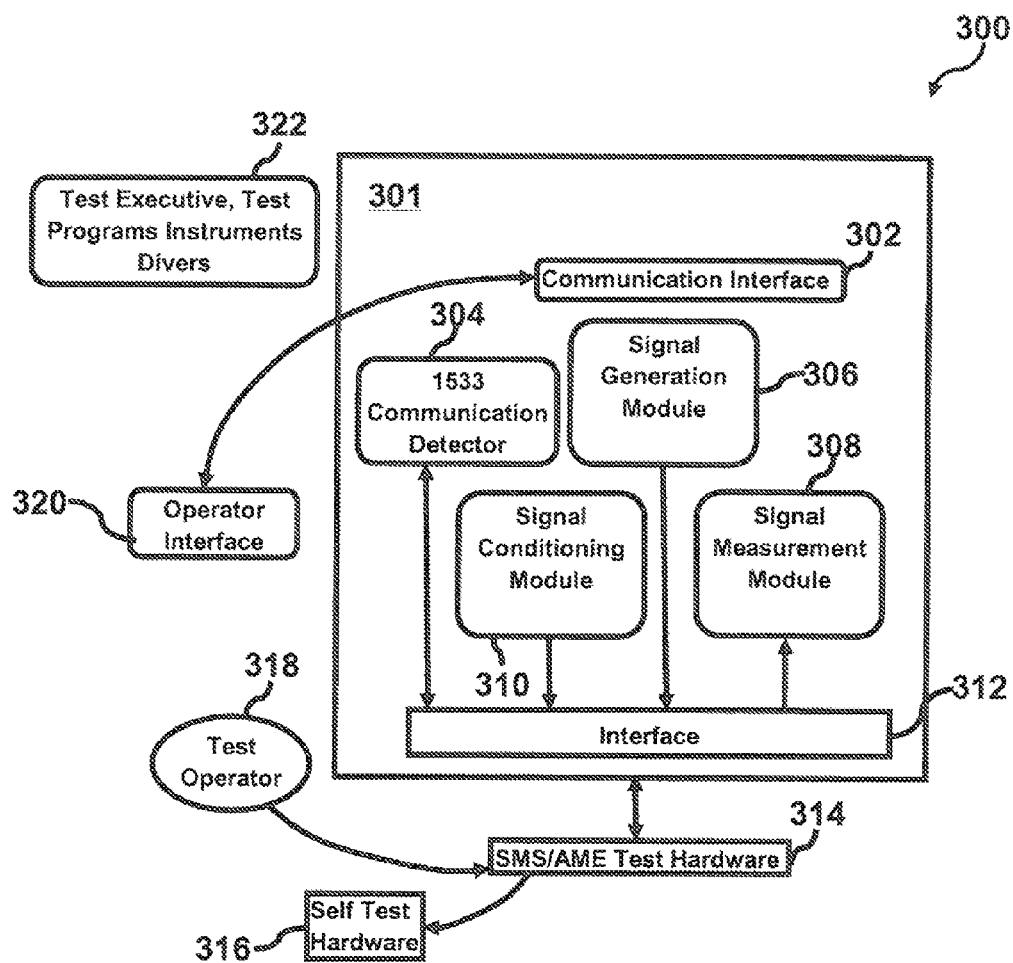
FIG. 3 illustrates a block diagram of a PMA toolkit core with Preload Test Capability, in accordance with the disclosed embodiments.

Referring FIG. 3, a block diagram of a PMA toolkit core 300 with preload test capability is shown. A Remote Control Unit (RCU) Backpack 301 has a signal conditioning module 310, a signal generation module 306, a signal measurement module 308 and a communication detector 304. The modules 310, 306 and 308 and the communication detector 304 are connected to an interface 312. The interface 312 has various ports for performing electrical testing and data acquisition.

An operator interface 320 allows the aircraft maintainer to select required test modes and send test command to aircraft through a communication interface 302. A test operator 318 can perform cable hookup and test actions by utilizing a Stores Management System (SMS) or Alternate Mission Equipment (AME) test hardware 314. Self test can be performed by utilizing a self test hardware 316.

The PMA toolkit core 300 also comprises of test executive, test programs and other instrument drivers 322 required for test operations. Note that the PMA toolkit core makes the PMA adaptable to many different maintenance and diagnostic applications through the use of different, replacement backpacks, or add-on adapters to the PMA. This specific embodiment describes the Preload Test Unit and Stray voltage tester unit.

Figure 4:
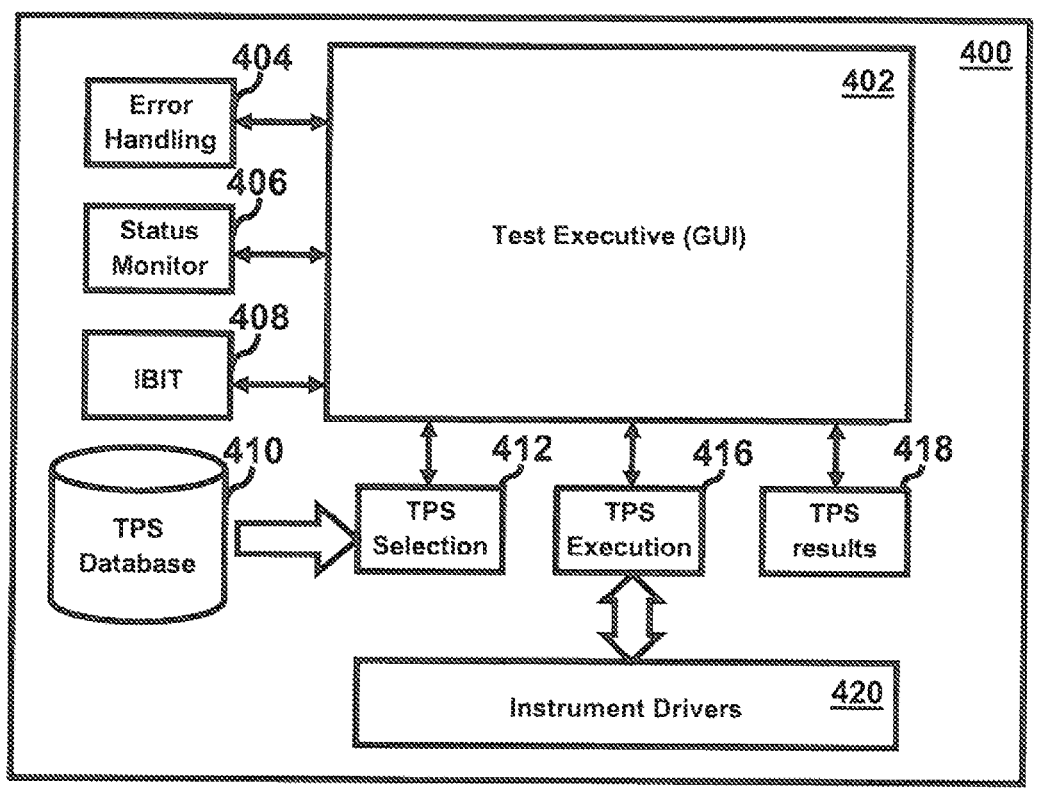
FIG. 4 illustrates a block diagram of a software architecture of a PTU, in accordance with the disclosed embodiments.

Referring to FIG. 4, a block diagram of a PTU software architecture 400 is disclosed. Based on the test conditions, a test executive 402 selects a test program from a Test Program Set (TPS) database 410 through a TPS selection module 412. The test executive 402 can evoke a test from a Initiate Built in Test (IBIT) module 408. The selected test program is executed by a TPS execution module 416 through instrument drivers 420. A TPS results module 418 generates test results which are displayed on status monitor 406. An error handling module 404 can be utilized to detect and correct errors during preload test.

Note that the selection GUI provides a quick and intuitive means for selecting the required Test Program Set (TPS). Also the software architecture may be adapted to meet the requirements of other similar test systems by modifying the TPS database.

Figure 5:
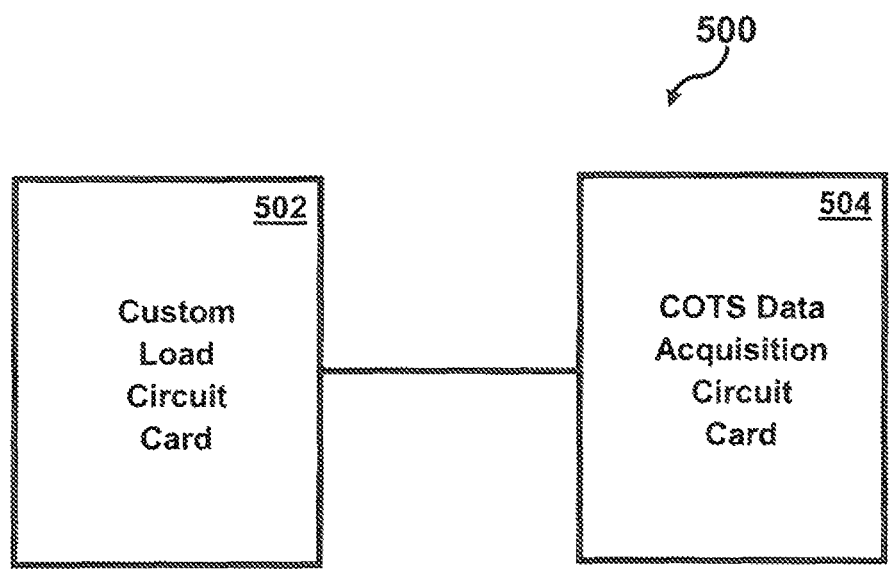
FIG. 5 illustrates a block diagram of a PTU circuit card, in accordance with the disclosed embodiments.
Figure 6:
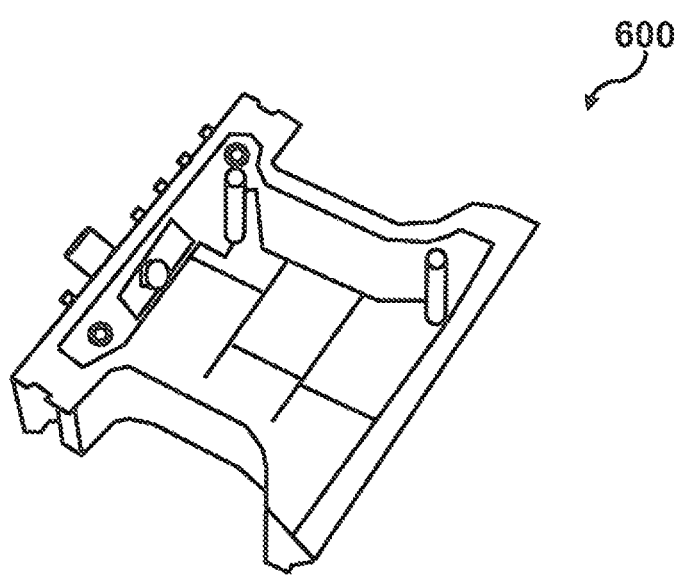
FIG. 6 illustrates a perspective view of a PMA toolkit PTU backpack housing, in accordance with the disclosed embodiments.

FIG. 5 illustrates a block diagram of a PTU circuit card 500 showing two circuit cards. As shown in FIG. 5, a load circuit card 502 is connected with an industry standard Commercial off the Shelf (COTS) data acquisition circuit card 504. Referring to FIG. 6 a PMA Toolkit PTU backpack housing 600 is shown.

Note that the PTU integrates a COTS rugged mobile handheld computer, a design circuit card, a COTS data acquisition card and harnesses, all enclosed in housing. Furthermore, an operational software is also featured, including a Graphical User Interface (GUI).

Figure 7:
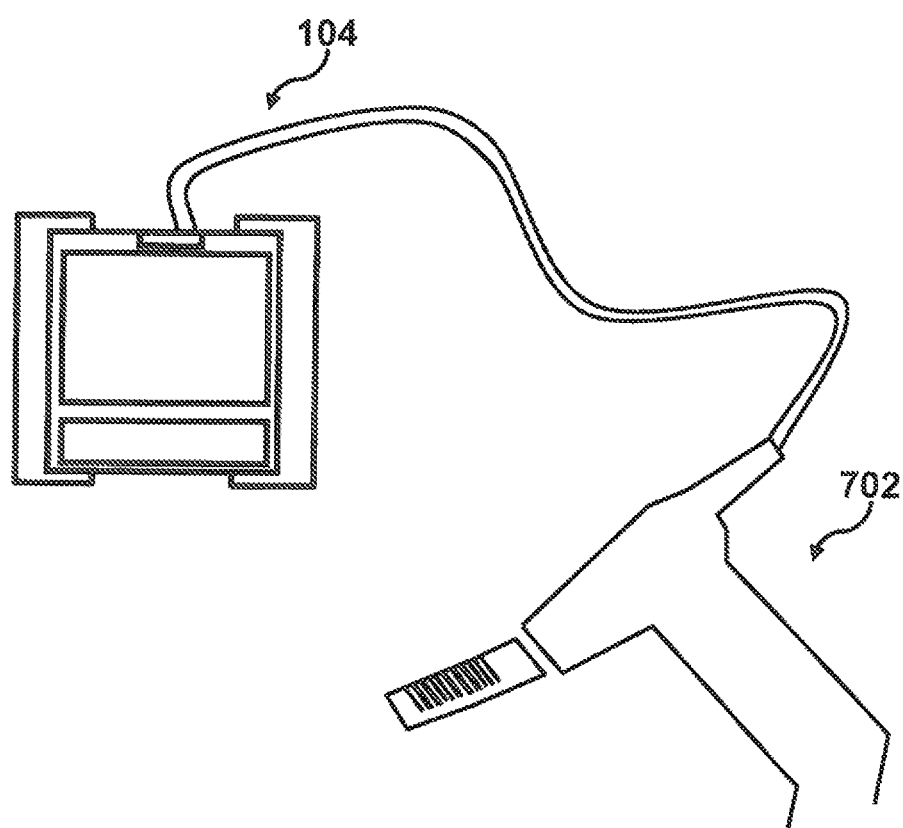
FIG. 7 illustrates a perspective view of a PTU with a microscan module, in accordance with the disclosed embodiments.

Referring FIG. 7, one embodiment of the PTU 104 is shown with a microscan module 702 attached. The microscan module 702 may be used as a UID, or bar code reader. Note that the microscan module for tracking Line Replacement Units, alternate mission equipment, etc. may be implemented into the same PMA. Data collected by the microscan module may be transferred to a database for asset tracking and inventory management. The PMA has a USB port for interfacing with the microscan module. The PMA is sustainable, has less replaceable components and has capability of filling the current test voids for various air/ground vehicle platforms.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A portable maintenance testing device for use in electrical testing and maintenance of vehicles and weaponry, comprising:
    a preload test unit for detecting and testing presence of stray voltage prior to weapon loading comprising:
        a test program set reconfigurable database having stored one or more test programs;
        a test program set selection module configured for selecting one of the test programs from the one or more programs;
        a built in test module for evoking the selected one of the test programs; and
        a test program set execution module for executing the evoked one of the test programs using one or more instrument drivers;
    an interface adapter having a plurality of electrical testing and data acquisition ports, wherein the interface adaptor utilizes one or more replaceable backpacks having one or more maintenance and diagnostic applications;
    a user interface configured to transmit data to said interface adapter;
    a display configured to communicate information from said interface adapter; and
    a communication interface for communicating data between said user interface, said display and said interface adapter.

2. The device of claim 1, wherein said preload test unit integrates a commercial off the shelf rugged mobile handheld computer, a design circuit card, a commercial off the shelf data acquisition card and harnesses and encloses in a housing.

3. The device of claim wherein an electronics circuit card of said preload test unit comprises a custom goad circuit card connected with an industry standard commercial off the shelf data acquisition circuit card.

4. The device of claim 1, further comprising a microscan module coupled with the preload test unit for collecting data wherein the data collected by the microscan module is transferred to a database for asset tracking and inventory management.

5. The device of claim 1, wherein said interface adapter utilizes a plurality of add-on adapters for said maintenance and diagnostic applications.

6. The device of claim 1, wherein said interface adapter allows electrical testing and data acquisition of a plurality of vehicles.

7. The device of claim 1, wherein said vehicles comprises air and ground vehicles.

8. The device of claim 1, wherein said user interface allows selection of a test program from a plurality of test programs to meet a plurality of application requirements.

9. The device of claim 1, wherein said display communicates testing and maintenance information to a user.

10. A method for electrical testing and maintenance of vehicles and weaponry, comprising
    detecting and testing presence of stray voltage prior to weapon loading by utilizing a preload test unit, wherein the preload test unit is configured for:
        selecting a test program from a test program set reconfigurable database through a test program selection module;
        evoking a test program through a initiate built in test module;
        executing the evoked test program by a test program execution module using one or more instrument drivers; and
        generating one or more test results by a test program results module;
    configuring a user interface to transmit data to an interface adapter, wherein said interface adapter has a plurality of electrical testing and data acquisition ports and utilizes one or more replaceable backpacks to allow a plurality of maintenance and diagnostic applications;
    configuring a display to communicate information from said interface adapter; and
    communicating data between said user interface, said display and said interface adapter by utilizing a communication interface.

11. The method of claim 10, wherein said preload test unit integrates a commercial off the shelf rugged mobile handheld computer, a design circuit card, a commercial of the shelf data acquisition card and harnesses and encloses in a housing.

12. The method of claim 10, wherein an electronics circuit card of said preload test unit comprises a custom load circuit card connected with a commercial off the shelf data acquisition circuit card.

13. The method of claim 10, further comprising collecting data by a microscan module coupled with the preload test unit wherein the collected data collected is transferred to a database for asset tracking and inventory management.

14. The method of claim 10, wherein said interface adapter utilizes a plurality of add-on adapters for said maintenance and diagnostic applications.

15. The method of claim 10, wherein said interface adapter allows electrical testing and data acquisition of a plurality of vehicles.

16. The method of claim 10, wherein said vehicles comprises air and ground vehicles.

17. The method of claim 10, wherein said user interface, allows selection of a test program from a plurality of test programs to meet a plurality of application requirements.

18. The method of claim 10, wherein testing and maintenance information is communicated to a user by utilizing a display.

* * * * *